(12) United States Patent
Pithoud et al.

(10) Patent No.: US 9,589,223 B2
(45) Date of Patent: Mar. 7, 2017

(54) MODULAR RADIO-IDENTIFICATION SYSTEM WITH PASSIVE RFID MODULE AND ACTIVE RFID MODULE

(71) Applicant: EDITAG, Meyreuil (FR)

(72) Inventors: Frédéric Pithoud, Marseilles (FR); Yannick Bachelet, Mimet (FR); Boris Lourie, Les Milles (FR)

(73) Assignee: EDITAG, Meyreuil (FR)

( * ) Notice: Subject to any disclaimer, the term of this patent is extended or adjusted under 35 U.S.C. 154(b) by 0 days.

(21) Appl. No.: 14/896,319

(22) PCT Filed: May 28, 2014

(86) PCT No.: PCT/FR2014/051268
§ 371 (c)(1),
(2) Date: Feb. 10, 2016

(87) PCT Pub. No.: WO2014/195609
PCT Pub. Date: Dec. 11, 2014

(65) Prior Publication Data
US 2016/0162768 A1 Jun. 9, 2016

(30) Foreign Application Priority Data

Jun. 4, 2013 (FR) ..................................... 13 55106

(51) Int. Cl.
*G06K 19/07* (2006.01)
*G06K 19/077* (2006.01)
(Continued)

(52) U.S. Cl.
CPC ... *G06K 19/0723* (2013.01); *G06F 17/30519* (2013.01); *G06K 7/10297* (2013.01);
(Continued)

(58) Field of Classification Search
USPC ........................................ 235/487; 455/575.1
See application file for complete search history.

(56) References Cited

U.S. PATENT DOCUMENTS

2009/0227299 A1* 9/2009 Seeley .............. H04M 1/72527
455/575.1

FOREIGN PATENT DOCUMENTS

| CN | 101996335 A | 3/2011 |
| EP | 1622066 A1 | 2/2006 |
| EP | 2595094 A1 | 5/2013 |

OTHER PUBLICATIONS

International Search Report issued Aug. 8, 2014 re: Application No. PCT/FR2014/051268; citing: EP 2 595 094 A1, EP 1 622 066 A1 and CN 101 996 335 A.

* cited by examiner

*Primary Examiner* — Allyson Trail
(74) *Attorney, Agent, or Firm* — Cantor Colburn LLP

(57) ABSTRACT

A modular radio-identification system including a first passive radio-identification module having a housing with a memory for storing an identification datum disposed inside the housing and being linked to an antenna. The system also includes a second active radio-identification module having a housing with a controller disposed therein, the controller being linked to a supply battery, to a transmitter/receiver and to at least one sensor. The housings of the two modules are equipped with components of reversible and complementary fixing which are adapted for co-operating together so as to allow the reversible fixing of the second module on the first module. The modules include electrical connection components adapted for establishing an electrical connection between the memory and the controller once the second module is fixed on the first module. The system may be supplemented with a hood for covering the first module.

13 Claims, 2 Drawing Sheets

(51) Int. Cl.
*G06F 17/30* (2006.01)
*G06K 7/10* (2006.01)
(52) U.S. Cl.
CPC ..... *G06K 19/0702* (2013.01); *G06K 19/0772* (2013.01); *G06K 19/07737* (2013.01); *G06K 19/07749* (2013.01)

MODULAR RADIO-IDENTIFICATION SYSTEM WITH PASSIVE RFID MODULE AND ACTIVE RFID MODULE

TECHNICAL FIELD

The present disclosure relates to a modular radio-identification system, and to a method for assembling such a modular radio-identification system. The disclosure is in the fields of remote identification, localization, supervision and monitoring of objects or people, by means of radio-identification technologies called RFID for <<Radio Frequency Identification>>.

BACKGROUND

In RFID technology, three radio-identification modules (also called marker, beacon or transponder) are known, namely the passive RFID module, the active RFID module and the semi-passive RFID module. The RFID passive module, also called radio-tag, simply integrates a memory, of the electronic chip type, and an antenna linked to the memory to enable the short-range reading of an identification data stored in the memory by a reader; the reader being composed of a radio frequency transmitter that activates the RFID passive module by providing it at short distance with the energy it needs to communicate its identification data. The passive RFID module thus enables the communication of the identification data to and on the initiative of an outer infrastructure, by means of a short-range reader, typically up to about ten meters.

The active RFID module integrates a controller provided with a memory and linked to a supply battery and also to a radio frequency transmitter/receiver. An active RFID module enables the identification, the supervision and optionally the recording of measurement data coming from one or more sensor(s) equipping the module. Thus, this active RFID module enables the data communication (identification data stored in the memory and optionally measurement data from the sensor(s)) to an outer infrastructure and on the initiative of the module controller which sends these data at regular time intervals, with a long-range, typically of about hundred meters.

The semi-passive RFID module, also called <<BAP tag>> for <<Battery-Assisted Passive tag>> or passive battery-assisted marker, combines the active RFID technology and the passive RFID technology, by integrating a memory linked to an antenna and to a battery. Thus, the battery allows increasing the reading range of the identification data stored in the memory by a medium-range reader, typically up to a few tens of meters: the communication between the semi-passive RFID module and the outer infrastructure occurring on the initiative of the infrastructure as in the passive technology, and not on the initiative of the module, on a long-range, typically of about hundred meters.

The aforementioned three modules are all frozen in their respective technologies, so that it is necessary to resort to two distinct modules, namely an active RFID module and a passive or semi-passive RFID module, to carry out, on the one hand, a single identification over a long period and, on the other hand, an identification, a supervision and a recording over a short period.

Indeed, it is sometimes necessary to resort to either of the RFID technologies according to the phases of objects use or of people activity. By way of example, many objects in various fields of use (eg. artwork or industrial assets, valuables, samples and perishable goods) may have distinct phases of use with distinct needs:

- a storage phase over a long period (eg. over several years) that requires only the ability to identify each object by means of passive or even semi-passive RFID modules;
- a supervision phase over short periods (eg. temporary exhibition of artwork, use of industrial assets for the implementation of a method used punctually, transport) which may concern some of the objects and which requires the ability not only to identify, but also to supervise, to monitor with sensors and to locate the objects in question by means of active RFID modules.

The only passive or semi-passive RFID technology is not adapted for supervision phases as it does not allow meeting the needs of supervision and recording of data measured by sensors; no supervision is possible with the passive and semi-passive RFID modules due to the initiative of the communication by the infrastructure.

As for the only active RFID technology, it is not adapted for the storage phases because the management of the batteries of the multiple active modules is prohibitive in terms of organization and cost; this problem arising at smaller scale with the semi-passive RFID modules which are less energy-consuming.

It is therefore conventional to fasten on the stored objects passive RFID modules which have the advantage of avoiding batteries management during the long storage phases and, during the short supervision phases, to temporarily fasten on the used objects active RFID modules without link or connection with the passive RFID modules.

The drawbacks to proceed this way are, firstly, that the fastening of two separate modules on the same object presents intrusion problems on the objects, particularly on the fragile objects and/or valuables such as artwork, and secondly, that the fastening of an active RFID module on an object is a time-consuming and sometimes complex operation because it is directly fastened on the object to be monitored.

In addition, it is necessary to double the manual operations called attachment or <<commissioning>> operations, with an attachment for the passive RFID modules and an attachment for the active RFID modules; the attachment including attaching or associating a module to the object on which is fastened in a database operated by the outer infrastructure. This doubling of the attachment operations is of course costly in manual work time, not to mention the risks of error which increase with the number of attachment operations.

Similarly, it is necessary to double the manual operations called detachment or <<decommissioning>> operations; the detachment including detaching or disassociating a module from the object on which it is fastened in the database.

Moreover, with the risks of error which are inherent to the attachment operations, it is not certain that the sensor measurement data transmitted by an active RFID module are well associated to the object to which is attached the active RFID module in question in the database.

Finally, in the case where an active RFID module must behave differently depending on the object on which it is fastened, it is necessary to proceed to a manual and time-consuming programming, either at the outer infrastructure or at the active RFID module itself, at each use of the active RFID module on the object.

SUMMARY

The present disclosure aims to solve all or part of the aforesaid drawbacks, by providing a modular radio-identification system that reduces the risks of error of attachment and detachment, and which provides at lower cost a solution which covers all use phases of the support to be monitored.

To this end, the disclosure provides a modular radio-identification system of the type comprising:
- a first passive radio-identification module comprising a casing inside which is disposed a memory for storing an identification data linked to an antenna; and
- a second active radio-identification module comprising a casing inside which is disposed a controller linked to a supply battery, with a radio frequency transmitter/receiver and to at least one sensor for measuring a physical parameter;
- wherein the casings of the two modules are equipped with reversible and complementary fastening means adapted to cooperate together in order to enable the reversible fastening of the second module on the first module;
- and the modules comprise electrical connection means adapted to establish an electrical connection between the memory of the first module and the controller of the second module once the second module is fastened on the first module.

Thus, the disclosure provides a modular system for:
- simply identifying at short distance the support (object or person) by means of the first passive RFID module, this first module being intended to be fastened on the support desired to be identified by attaching the first module to the support in a database, to satisfy inventory needs, presence detection needs at reading/writing and/or anti-theft safety points, the second module being then absent, in other words not coupled to the first module;
- identifying at long distance, supervising, locating and monitoring the support by means of the first and second coupled modules, the second module allowing to measure one or more physical monitoring parameter(s) of the support, and the data exchange (identification data and measurement data from the sensor(s)) on the initiative of the controller of the second module and over long-range; and
- optionally identifying at medium distance the support if the first module is equipped with a battery to convert it into semi-passive RFID module.

As a result of the disclosure, the second module does not include any identification data stored by its controller (except its internal serial number), and remains completely generic. When the two modules are coupled (mechanical and electrical couplings), the second module is associated to the identification data of the first module, in other words the attachment of the second module with the support is automatically performed when coupled with the first module that carries an identification data thereto, allowing advantageously to do without a manual operation of attachment from the second module to the support.

In addition, as another result of the disclosure, the second module is physically fastened on the first module, and not directly on the support, thus simplifying the anchoring operation on the support, not to mention that this second module is firstly associated to the first module (and not to the support) before being then associated to the support (during the attachment in the database) via the first module previously identified and attached to the support in the database.

Furthermore, such a solution has several other applications, such as:
- the possibility to trigger the transmission of radio signals allowing to trace production/logistics events (in particular and without limitation, events of the type replenishment request or proof of delivery) during the juxtaposition and/or the separation of the two modules, in a simple manner and while avoiding any transaction on a computer system;
- the consultation via the first module of juxtaposition historical data or of sensors coming from the second module.

Advantageously, the modular system further comprises a covering cowl of the first module, said cowl comprising reversible fastening means adapted to cooperate with the fastening means of the casing of said first module, said cowl covering the connection means of the first module once the cowl is fastened on the first module.

Thus, when the second module is not used, the first module and its connection means are protected by means of the removable cowl, this cowl being reversibly fastened on the first module due to the same fastening means as those used for fastening the second module on the first module.

In a particular embodiment, the cowl integrates a battery linked to electrical connection means adapted to establish an electrical connection with the connection means of the first module once the cowl is fastened on the first module.

In this manner, the cowl equipped with a battery allows converting the first module into a semi-passive RFID module, and thus increasing the reading range.

Advantageously, the first module has fastening means arranged on a portion of its casing which does not completely cover its antenna, so that the second module does not fully cover said antenna once the second module is fastened on the first module.

Thus, the second module does not interfere with the radio radiation at the antenna of the first module.

According to one characteristic, the casing of the first module has a flat shape with a predetermined thickness, and the casing of the second module has a receiving notch of the first module having a depth equivalent to the thickness of the casing of the first module, where the fastening means of the second module are provided in said notch.

Thus, the whole system (with the two coupled modules) has a reduced thickness on the support, thus limiting congestion.

According to another characteristic, the fastening means are snap-fastening means, which ensure a mechanical locking between the two casings.

In a particular embodiment, the first module integrates an electrical connection between the memory and the antenna, said connection being made at least partly on an external face of the casing of the first module and having a breakable part provided with adhesion means on the support.

Thus, once the first module is fastened on the support, said breakable part adheres to the support. If we proceed to removing the first module, the breakable part remains adhered on the support and the electrical connection between the memory and the antenna is broken, making inoperative the first module.

The disclosure also relates to a method for assembling a modular radio-identification system in accordance with the disclosure, comprising a fastening phase of the first module on a support, particularly an object or a person, followed by a coupling phase of the second module on the first module with:
- the fastening of the casings by cooperation between their respective fastening means, and
- the connection between the memory of the first module and the controller of the second module by contact between the electrical connection means.

According to one possibility of the disclosure, after the coupling phase, the controller automatically transmits a coupling signal, to inform thereby an outer infrastructure of the coupling.

According to another possibility of the disclosure, the method further comprises the following attachment phases:
- a first attachment phase, between the fastening phase and the coupling phase, wherein the first module is attached to the support in a database operated by an outer infrastructure, with a reading step by the outer infrastructure of the identification data stored in the memory of the first module;
- a second attachment phase, after the coupling phase, wherein the second module is attached to the support in the same database, with the controller of the second module retrieving the identification data stored in the memory of the first module and communicating this identification data to the outer infrastructure, so that the first and the second modules are associated to the same identification data and to the same support in the database.

In other words, and as explained above, the attachment of the second module is made automatically when coupling between the modules, with a common identification data to the two modules for the outer infrastructure, making more reliable and thus simplifying the attachment of the second module to the support.

The assembly method may also comprise successively:
- a decoupling phase of the second module vis-à-vis the first module, the first module remaining fastened on the support, with the separation between the casings and the disconnection between the memory of the first module and the controller of the second module,
- a detachment phase wherein the second module is detached from the support in the database, with the controller of the second module automatically communicating a detachment data to the outer infrastructure following the disconnection of said controller with the memory of the first module.

Thus, the detachment of the second module is also made automatically, without manual operation and without risk of error in the database.

It is also considered that, before the coupling phase, data related to the support and/or operation parameters of the second module are stored in the memory of the first module, and then, after the coupling phase, the controller reads automatically these data related to the support and/or these parameters related to the second module via the electrical connection between the two modules for a supervision of the support by the second module adapted to the characteristics of said support and said second module.

Thus, without having to undertake any work on the second module or on the outer infrastructure, the second module retrieves data related to the support as soon as the coupling with the first module is done, for a supervision in line with the characteristics of the support. For example, these data related to the support will have an influence on the controller in the management of the sensor(s), the management of possible alerts, the management of the communications by the radio frequency transmitter/receiver, particularly on the periodicity of sending to the outer infrastructure.

In addition, this assembly method may be concluded by a removal phase of the first module vis-à-vis the support, said removal making said first module automatically inoperative, thus preventing the outer infrastructure from taking into account this first module which is no longer attached to a support.

BRIEF DESCRIPTION OF THE DRAWINGS

Other characteristics and advantages of the present disclosure will appear on reading the detailed description below, by way of a non-limiting example of implementation, with reference to the appended figures wherein.

DETAILED DESCRIPTION OF THE DRAWINGS

Figure 1:
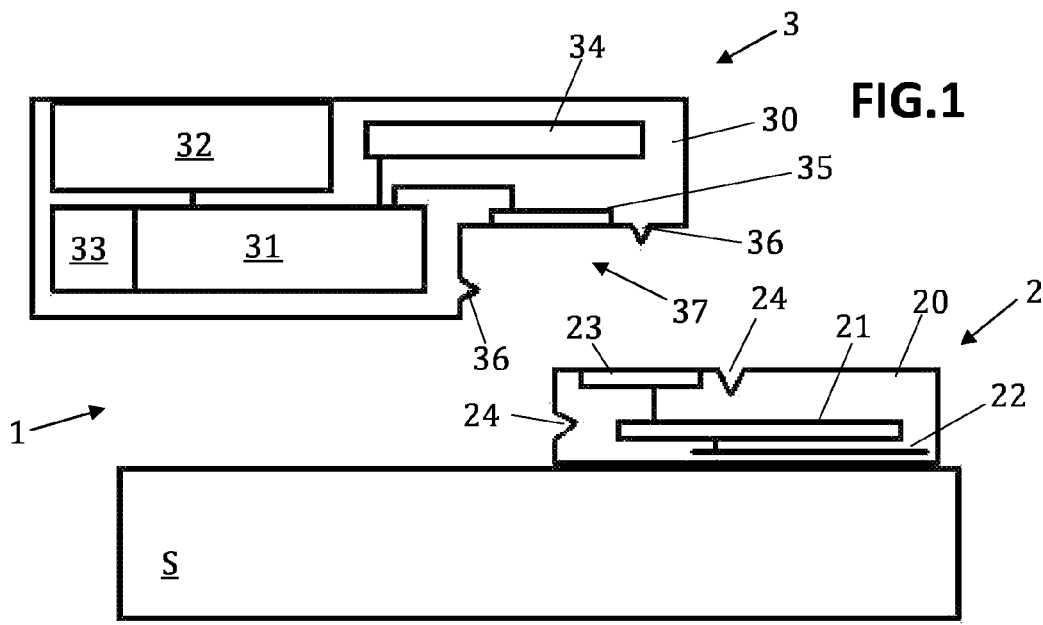
FIGS. 1 and 2 are schematic views of a system in accordance with the disclosure, respectively before and after coupling between the two modules.
Figure 2:
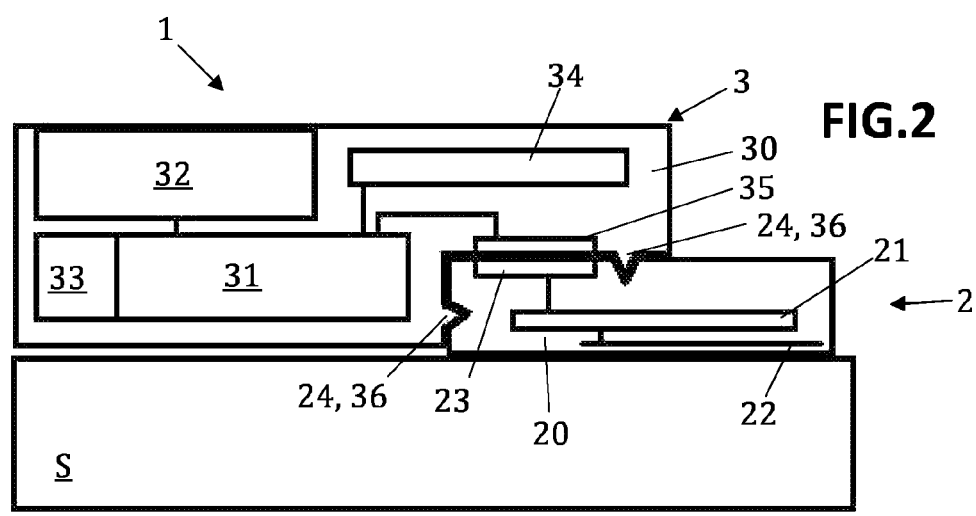

Referring to FIGS. 1 and 2, a modular radio-identification system 1 in accordance with the disclosure includes a first passive radio-identification module 2 and a second active radio-identification module 3.

The first module 2 includes a casing 20 inside which are disposed a memory 21 for storing an identification data and other parameters specific to the first module 2, and an antenna 22 linked to the memory 21. The first module 2 also integrates an electrical connector 23 disposed on the outside of the casing 20 and linked to the memory 21. The casing 20 also has reversible (or removable) fastening means 24, particularly of the type snap-fastening means. These fastening means 24 are provided on a portion of the casing 20, without covering the antenna 22. The electrical connector 23 is provided on this same portion of the casing 20. The casing 20 has a flat shape with a predetermined thickness, preferably lower than 3 millimeters.

The second module 3 includes a casing 30 inside which are disposed a controller 31 (particularly of the microcontroller type), a power supply battery 32 linked to the controller 31, a radio frequency transmitter/receiver 33 linked to the controller 31, and at least one sensor 34 for measuring a physical parameter (such as an accelerometer, a temperature sensor, a humidity sensor, a contact sensor, a pressure sensor, etc.) linked to the controller 31. The radio frequency transmitter/receiver 33 is particularly suitable for any type of stationary or movable radio infrastructure and, by way of a non-limiting example, operates according to UHF, GSM, WiFi, Bluetooth, 3G, Zigbee communication standards or any other wireless communication standards.

The second module 3 also integrates an electrical connector 35 disposed on the outside of the casing 30 and linked to the controller 31. The casing 30 also has a hatch (not illustrated) for accessing to the battery 32 in order to allow its replacement. The casing 30 also has reversible fastening means 36 which are complementary to the fastening means 24 of the casing 20, in order to enable the reversible fastening of the casing 30 on the casing 20 by cooperation between the fastening means 24, 36, in particular by form cooperation and elasticity in the case of snap-fastening means. The casing 30 has a flat shape with a predetermined thickness greater than that of the casing 20 and preferably smaller than 5 millimeters. The casing 30 has a notch 37 for receiving the casing 20, the fastening means 36 being provided in this notch 37, and this notch 37 has a depth equivalent to the thickness of the casing 20. The notch 37 is short enough so as not to completely cover the antenna 22, so that the second module 3 does not completely cover the antenna 22 and enables communication between a reader L and the first module 2.

Figure 3:
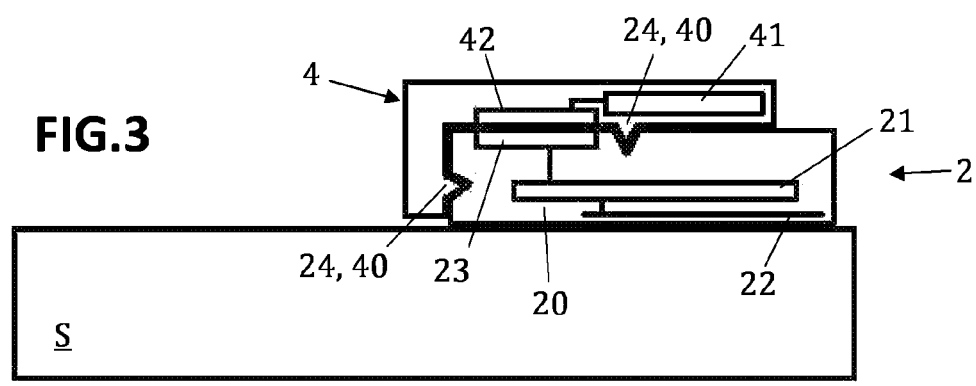
FIG. 3 is a schematic view of the first module of the system of FIGS. 1 and 2, with a protection cowl.

Referring to FIG. 3, the first module 2 can be covered by a protection cowl 4, mainly intended for the protection of the electrical connector 23 in the absence of the second module 3. This covering cowl 4 of the first module 2 comprises reversible fastening means 40 adapted to cooperate with the fastening means 24 of the casing 20, so that this cowl 4 is fastened on the first module 2 in the same manner as the second module 3. As visible in FIG. 3, this cowl 4 covers the electrical connector 23 once fastened on the first module 2.

Optionally, this cowl 4 integrates a battery 41 linked to an electrical connector 42 adapted to establish an electrical connection with the electrical connector 23 of the first module 2 once the cowl 4 is fastened on the first module 2. Thus, the battery 41 can electrically supply the first module 2, so that the assembly first module 2/cowl 4 forms a semi-passive RFID module.

Figure 4:
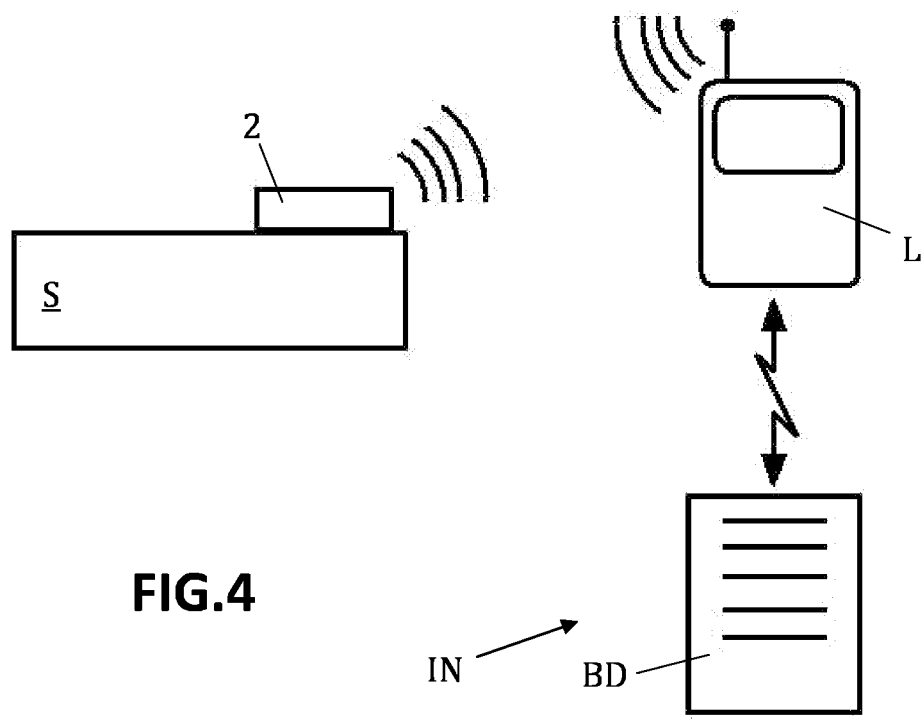
FIG. 4 is a schematic view of a first use of the system in accordance with the disclosure, with only the first module fastened on an object.

In a first use schematically illustrated in FIG. 4, only the first module 2 is fastened on the support S (object or person). In this use, a stationary or movable reader L can read at short or medium range the identification data stored in the memory 21, and this same reader L can communicate the identification data to a database BD operated by an outer infrastructure IN. Thus, a first attachment phase can be implemented, after the fastening of the first module 2 on the support S, wherein the first module 3 is attached to the support S in a database BD operated by the infrastructure IN, after the reading by a reader L of the identification data stored in the memory 21 of the first module 2 and the communication of this identification data by the reader L to the infrastructure IN.

Figure 5:
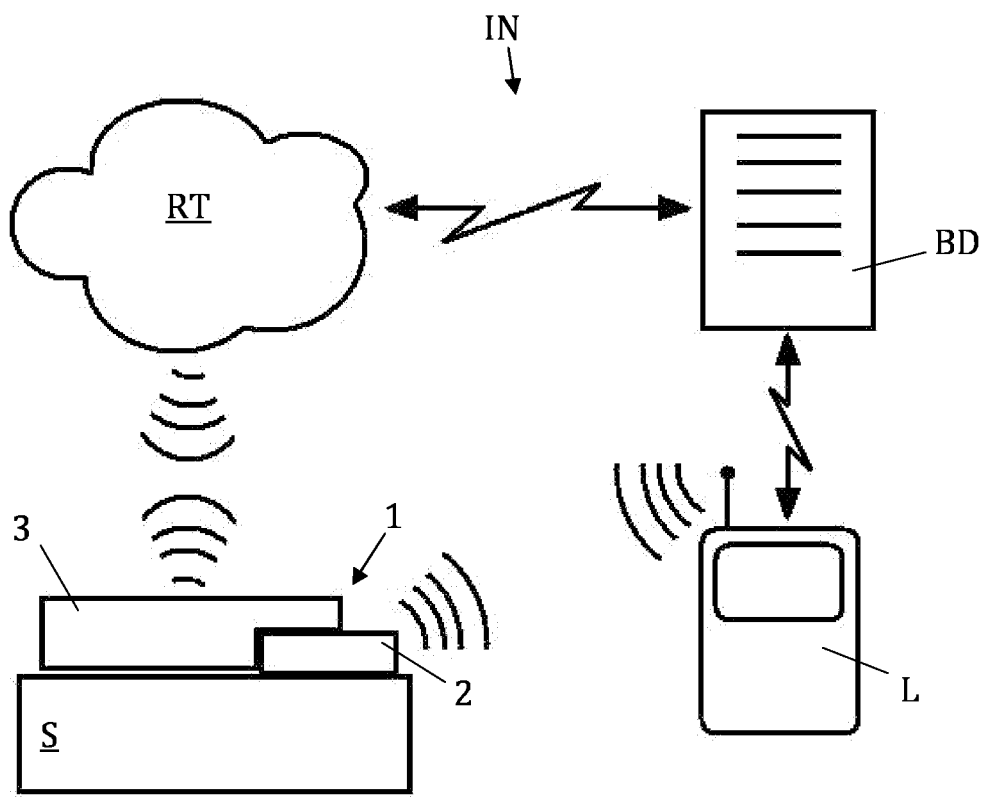
FIG. 5 is a schematic view of a second use of the system in accordance with the disclosure, with the two modules coupled.

In a second use schematically illustrated in FIG. 5, the second module 3 is coupled to the first module 2, by proceeding as follows:

the casing 30 is fastened on the casing 20 by cooperation between their respective fastening means 24, 36, and in a concomitant manner the memory 21 of the first module 2 and the controller 31 of the second module 3 are connected by contact between their connectors 23, 35.

Once the two modules 2, 3 are coupled, the controller 31 detects this coupling at the connector 35 and, in return, automatically transmits a coupling signal to the infrastructure IN.

In addition, once the two modules 2, 3 are coupled, a second attachment phase is implemented wherein the second module 3 is attached to the support S in the same database BD, with the controller 31 retrieving the identification data stored in the memory 21 of the first module 2 and communicating from its own initiative this identification data to the infrastructure via a telecommunication network RT due to its transmitter/receiver 33. Thus, the two modules 2, 3 are automatically associated to the same identification data and to the same support S in the database BD.

Thus, the manual attachment is made only once during the first attachment phase, when fastening the first module 2 on the support S. Then, only an automatic attachment is implemented in the second attachment phase, when coupling the second module 3 on the first module 2 (automatic <<commissioning>>).

To take into account the intrinsic characteristics of the support S in the controlling implemented by the controller 31, it is possible to provide:

before the coupling phase, data related to the support S (intrinsic characteristics of the support S) are stored in the memory 21 of the first module 2 preferably with a secure storage to avoid any malicious parameterization; and then after the coupling phase, the controller 31 automatically reads these data related to the support S in the memory 21 (preferably after checking the integrity of these data) to thereby establish, automatically and without the intervention on the controller 31 and on the infrastructure IN, a supervision of the support S adapted to the characteristics of the support S.

When the need of the second module 3 is not present, the following successive steps are implemented:

the second module 3 is decoupled vis-à-vis the first module 2, the first module 2 remaining fastened on the support S, by proceeding to the separation between the casings 20, 30 which results in the disconnection between the two connectors 23, 35; then the second module 3 of the support S is automatically detached in the database BD, with the controller 31 which automatically communicates a detachment data to the infrastructure IN (following the disconnection between the controller 31 and the memory 21 of the first module 2), and the infrastructure IN proceeds in response to the detachment (automatic <<decommissioning>>).

It should also be noted that if we proceed to a physical removal of the first module 2 vis-à-vis the support S, this removal makes the first module 2 automatically inoperative, particularly with a removal that may cause a wrenching or a split of a connection between the memory 21 and the antenna 22. In this case, the connection between the memory 21 and the antenna 22 is made at least partly on an external face of the casing 20 (the one which comes into contact with the support S), and this connection has a breakable part (which breaks beyond a given threshold force) which adheres to the support S. Thus, during the removal of the first module 2, the breakable part breaks while remaining adhered to the support S, so that the connection is broken between the memory 21 and the antenna 22.

The example of implementation mentioned above has no limiting character, and other improvements and details may be added to the system according to the disclosure, without departing from the scope of the disclosure where other forms of fastening means may for example be carried out.

The invention claimed is:

1. A modular radio-identification system comprising:
    a first module for passive radio-identification comprising a casing inside which is disposed a memory for storing an identification data linked to an antenna; and
    a second module for active radio-identification comprising a casing inside which is disposed a controller linked to a supply battery to a radio frequency transmitter/receiver and to at least one sensor for measuring a physical parameter;
    wherein the casings of both modules are equipped with reversible and complementary fastening means adapted to cooperate together in order to enable the reversible fastening of the second module on the first module;
    and the modules comprise electrical connection means adapted to establish an electrical connection between the memory of the first module and the controller of the second module once the second module is fastened on the first module.

2. The system according to claim 1, further comprising a cowl for covering the first module, said cowl comprising reversible fastening means adapted to cooperate with the fastening means of the casing of said first module, said cowl covering the connection means of the first module once the cowl is fastened on the first module.

3. The system according to claim 2, wherein said cowl integrates a battery linked to electrical connection means adapted to establish an electrical connection with the connection means of the first module once the cowl is fastened on the first module.

4. The system according to claim 1, wherein the first module has fastening means arranged on a portion of its casing which does not completely cover its antenna, so that the second module does not completely cover said antenna once the second module is fastened on the first module.

5. The system according to claim 1, wherein the casing of the first module has a flat shape with a predetermined thickness, and the casing of the second module has a notch for receiving the first module having a depth equivalent to the thickness of the casing of the first module, where the fastening means of the second module are arranged in said notch.

6. The system according to claim 1, wherein the fastening means are snap-fastening means.

7. The system according to claim 1, wherein the first module integrates an electrical connection between the memory and the antenna, said connection being carried out at least partly on an external face of the casing of the first module and having a breakable part provided with adhesion means on the support.

8. A method for assembling a system in accordance with claim 1, comprising a fastening phase of the first module on a support, followed by a coupling phase of the second module on the first module with:
the fastening of the casings by cooperation between their respective fastening means, and
the connection between the memory of the first module and the controller of the second module by contact between the electrical connection means.

9. An assembly method according to claim 8, wherein, following the coupling phase, the controller automatically transmits a coupling signal.

10. The assembly method according to claim 8, comprising the following attachment phases:
a first attachment phase, between the fastening phase and the coupling phase, wherein the first module is attached to the support in a database operated by an outer infrastructure, with a reading step by the outer infrastructure of the identification data stored in the memory of the first module;
a second attachment phase, after the coupling phase, wherein the second module is attached to the support in the same database, with the controller of the second module retrieving the identification data stored in the memory of the first module and communicating this identification data to the outer infrastructure, so that the first and the second modules are associated with the same identification data and to the same support in the database.

11. The assembly method according to claim 10, comprising successively:
a decoupling phase of the second module from the first module, the first module remaining fastened on the support, with the separation between the casings and the disconnection between the memory of the first module and the controller of the second module,
a detachment phase wherein the second module of the support is detached in the database, with the controller of the second module automatically communicating a detachment data to the outer infrastructure following the disconnection of said controller with the memory of the first module.

12. The assembly method according to claim 8, wherein, before the coupling phase, data related to the support are stored in the memory of the first module, and then, after the coupling phase, the controller automatically reads these data related to the support via the electrical connection between the two modules for a supervision of the support by the second module adapted to the characteristics of said support.

13. The assembly method according claim 8, comprising a removal phase of the first module from the support, said removal making said first module automatically inoperative.

* * * * *